Dec. 15, 1936.   N. SANTUCCI   2,064,569
PIPE TESTING PLUG
Filed Aug. 9, 1934
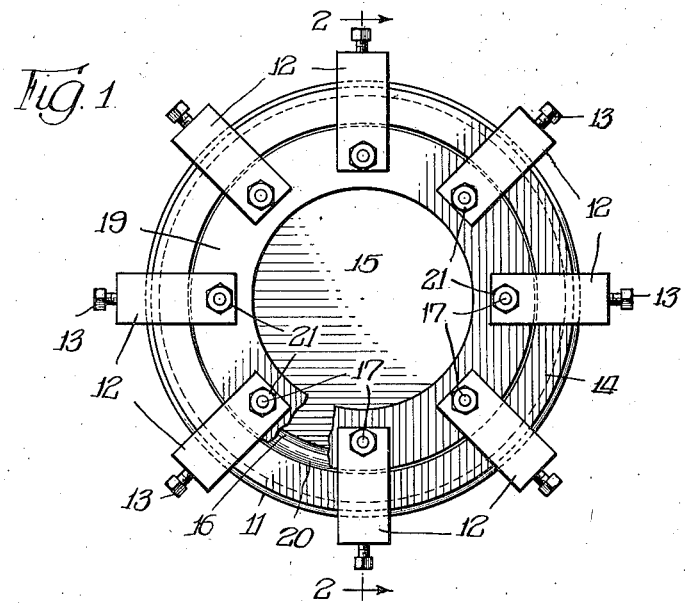
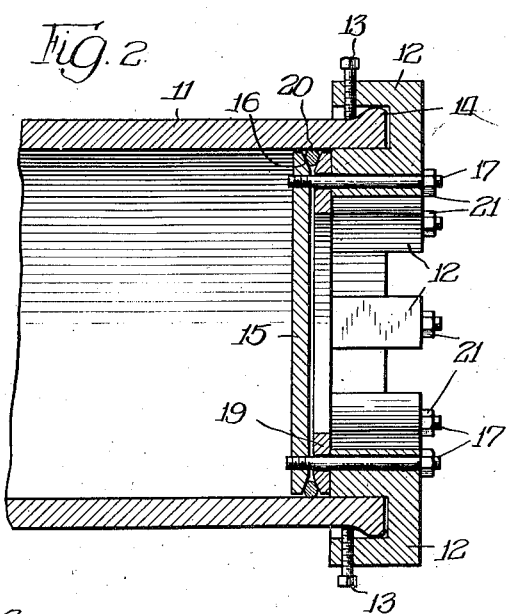
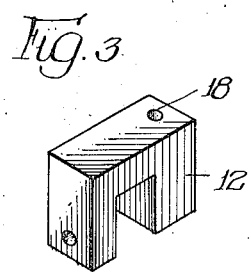
Inventor:
Nicholas Santucci,
By Cromwell, Greist & Warden
Attys.

Patented Dec. 15, 1936

2,064,569

UNITED STATES PATENT OFFICE 2,064,569

PIPE TESTING PLUG

Nicholas Santucci, Niles Center, Ill.

Application August 9, 1934, Serial No. 739,113

2 Claims. (Cl. 138—89)

The present invention relates to pipe testing plugs adapted for use in testing water mains, gas mains and the like.

It is the practice, upon completion of a section of a water main or similar pipe equipment which is buried in the ground or in inaccessible places, to apply pressure to the same to test it before connecting it up for service. This has been generally accomplished by the use of large heavy plugs at the end of the pipe which are expensive and inconvenient to handle particularly with large size pipe.

The primary object of the present invention is the provision of a pipe testing plug which is easy to use, comparatively light in weight and relatively inexpensive and which is particularly adapted for use with pipe that has a smooth bore at the ends.

A preferred embodiment of the invention is shown in the accompanying drawing. It is to be understood, however, that the form illustrated in the drawing is for purposes of exemplification and is not to be construed as unnecessarily limiting the scope of the protection sought and defined by the appended claims.

Referring to the drawing:

Fig. 1 is a view in elevation showing the device in place on the end of a pipe;

Fig. 2 is a section on the line 2—2 of Fig. 1; and

Fig. 3 is a detailed view of a clamp member.

In the drawing, the reference numeral 11 indicates the pipe. The reference numeral 12 designates the body portion of a clamp member. The clamp member is U-shaped in construction and is secured to the end of the pipe by means of a bolt 13 which is screw-threaded into one leg of the clamp member and engages the pipe in back of the enlarged end portion 14. The other leg of the clamp member fits flush against the smooth interior bolt of the pipe.

In the use of the device a plurality of clamp members, as is apparent from the drawing, are provided around the end of the pipe. A disk member 15, having its upper peripheral edge beveled at 16 is provided to fit within the bore of the pipe. Studs 17 are secured in the disk 15 and extend up through the opening 18 in the clamp member 12. An annulus or ring 19 is interposed between the bottom of the clamp member and the plate 15. The lower and outer peripheral edge of the annulus 19 is also beveled so that when it is in complementary relationship with the disk 15 it provides a V-shaped opening at the periphery of the disk 15 and the annulus 19. Holes are provided in the annulus 19 to register with the studs 17.

A sealing member 20, which may be formed of rubber or other compressible material, is placed in the V-shaped space formed at the peripheries of the members 15 and 19. A plurality of nuts 21 are threaded on the tops of the studs 17.

In the operation of the device the disk, with its projecting studs 17, is placed within the pipe. The members 20 and 19 are then put in place and finally the clamps 12 are passed over the studs and secured in place by means of the bolts 13.

The nuts 21 are then placed upon the studs 17 and tightened so as to express the sealing member 20 and form a tight joint. Pressure may then be applied to the pipe in any convenient manner for the purpose of testing. If it is desirable a threaded hole may be made in the disk 15 to which may be attached a pipe for introducing liquid or gas into the main pipe for the purpose of applying pressure.

The device has been found to be very useful in the testing of pipe, it is easily handled, can be put in place by one man and is adapted for use on pipe having a smooth bore at the end thereof. It has been found to be effective to withstand very high pressures, including pressures beyond any reasonable range required for testing purposes.

I claim:

1. A pipe testing plug comprising a disk adapted to fit within the end of a pipe, a sealing member adjacent said disk and extending around the periphery thereof, a plurality of U-shaped members adapted to pass over the end of a pipe, bolts passing at right angles through one leg of said clamps to engage the outside wall of said pipe, studs fixedly secured to said disk and passing upwardly through the other leg of said clamps and means for applying pressure to said sealing member.

2. A pipe testing plug comprising a disk adapted to fit within the end of a pipe, a sealing member surrounding said disk, a member cooperating with said disk and sealing member to express the latter radially when pressure is applied thereto, a plurality of substantially U-shaped clamping members adapted to pass over the edge of the pipe, bolts positioned at right angles to one leg of said clamp to engage the wall of the pipe, means secured at the periphery of said disk and passing upwardly through said clamps for causing pressure engagement between said disk, its cooperating member, sealing member and the inside leg of said clamp.

NICHOLAS SANTUCCI.